United States Patent
Yamanaka

(10) Patent No.: US 11,644,304 B2
(45) Date of Patent: May 9, 2023

(54) HEIGHT MEASUREMENT METHOD AND HEIGHT MEASUREMENT DEVICE

(71) Applicant: MITUTOYO CORPORATION, Kanagawa (JP)

(72) Inventor: Masafumi Yamanaka, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 387 days.

(21) Appl. No.: 17/106,638

(22) Filed: Nov. 30, 2020

(65) Prior Publication Data
US 2021/0164768 A1   Jun. 3, 2021

(30) Foreign Application Priority Data
Dec. 3, 2019   (JP) .............................. JP2019-218545

(51) Int. Cl.
*G01B 11/02* (2006.01)
*G02B 27/00* (2006.01)
(Continued)

(52) U.S. Cl.
CPC .......... *G01B 11/02* (2013.01); *G02B 27/0075* (2013.01); *H04N 23/55* (2023.01); *H04N 23/673* (2023.01)

(58) Field of Classification Search
CPC .............. G02B 27/0075; H04N 23/673; G01B 11/0608; G01B 11/02
See application file for complete search history.

(56) References Cited

U.S. PATENT DOCUMENTS

| | | | |
|---|---|---|---|
| 2010/0232650 A1* | 9/2010 | Kanetani ............ | G01B 11/0608 382/106 |
| 2017/0078549 A1* | 3/2017 | Emtman ................ | H04N 23/71 |
| 2019/0369300 A1* | 12/2019 | Freerksen ............... | G02B 3/14 |

FOREIGN PATENT DOCUMENTS

| | | | |
|---|---|---|---|
| DE | 102017129221 A1 * | 7/2018 | |
| JP | 2015-1531 | 1/2015 | |

(Continued)

OTHER PUBLICATIONS

Y. Qu, "Nonmechanical and multiview 3D measurement microscope for workpiece with large slope and complex geometry", Journal of Microscopy, 2018 (Year: 2018).*

(Continued)

*Primary Examiner* — Maurice C Smith
(74) *Attorney, Agent, or Firm* — Greenblum & Bernstein, P.L.C.

(57) ABSTRACT

A height measurement device includes: a lens system; a lens controller to output a drive signal to the lens system; a continuous illuminator to continuously illuminate a workpiece; an image detector to detect an image of the workpiece; an image calculation unit to calculate an EDOF image on a basis of a detected image; a focal depth adjustment unit to cause an extended focal depth of the EDOF image to be increased or decreased by increasing or decreasing an amplitude of the drive signal; a focus determination unit to determine a focus state of a portion of interest of the workpiece included in the EDOF image; and a height measurement unit to measure an upper limit or a lower limit of the extended focal depth, the upper limit or the lower limit being based on a timing at which the focus state of the portion of interest has changed.

2 Claims, 7 Drawing Sheets

(51) Int. Cl.
*H04N 23/55* (2023.01)
*H04N 23/67* (2023.01)

(56) References Cited

FOREIGN PATENT DOCUMENTS

| | | |
|---|---|---|
| JP | 2015-104136 | 6/2015 |
| JP | 2018-189702 | 11/2018 |

OTHER PUBLICATIONS

Kang, "Variable optical elements for fast focus control" Sep. 2020 (Year: 2020).*

* cited by examiner

HEIGHT MEASUREMENT METHOD AND HEIGHT MEASUREMENT DEVICE

The entire disclosure of Japanese Patent Application No. 2019-218545 filed Dec. 3, 2019 is expressly incorporated by reference herein.

TECHNICAL FIELD

The present invention relates to a height measurement method and a height measurement device.

BACKGROUND ART

A height of a workpiece has been measured using an image detection device. For example, the image detection device detects images of a workpiece while intermittently or continuously varying a focus position, and detects a focus position of a detected image at which a portion of interest of the workpiece is in an in-focus state, out of the detected images. Thus, the image detection device allows for measurement of a height of the portion of interest (see Patent Literature 1: JP 2015-1531 A).

As means for varying the focus position at the time of detecting an image, a variable focal length lens can be used besides a structure that relatively moves the workpiece (object) and a lens.

As the variable focal length lens, a liquid resonant lens system has been developed. The liquid resonant lens system generates a standing wave in the liquid provided therein by means of a periodic drive signal and varies the focus position periodically at a high frequency.

An image detection device has been developed in which such a liquid resonant lens system is combined with a pulsed light illumination device to detect an image focused on a portion of interest of a workpiece (see Patent Literature 2: JP 2018-189702 A).

The image detection device according to Patent Literature 2 is able to detect a single focus image in an imaging plane including a focus position corresponding to a phase angle by synchronizing a predetermined phase angle of a drive signal that drives the lens system with a pulsed light illumination. In addition, the image detection device is able to detect a multi-focus image of an object by setting a plurality of phase angles with which the pulsed light illumination is to be synchronized within one cycle of the drive signal.

Further, the image detection device according to Patent Literature 2 is able to detect a focal sweep image (multi-focus superimposed image obtained by focus position scanning) in which the focus position is continuously varied, or an EDOF (Extended Depth of Field or extended field depth) image.

Of those, the focal sweep image has a large number of images superimposed on each other. The images respectively correspond to the focus positions to be swept. Each of the images that have been superimposed includes blur image information that is out of DOF (Depth of Field, or field depth). As a result, blurring of the object as a whole is unavoidable in the superimposed image. In contrast, the EDOF image can be made into a relatively clear image in which a blurring amount is suppressed in each portion of the object over all focus positions by performing a calculation process on the focal sweep image using PSF (Point Spread Function), calculating an estimated value of the blurring amount in a depth direction of the image, and performing deconvolution on the blurring image (see Patent Literature 3: JP 2015-104136 A).

As described above, the height of the workpiece can be measured by the image detection device including the variable focal length lens. In a case where a liquid resonant variable focal length lens is included in the image detection device for measuring the height, it has been necessary to combine therewith the pulsed light illumination device that emits light at a focus point.

The pulsed light illumination device desirably has an illumination performance of a large light quantity at an accurate timing, and such a pulsed light illumination device is generally expensive. In addition, the liquid resonant variable focal length lens involves a high driving frequency. Accordingly, a duration of the continuous illumination is as short as it is in the unit of nanoseconds. This necessitates a high-output high-current to obtain a large amount of light in such a short time, which also increases technical issues.

Therefore, also in a case where the height is to be measured by the image detection device including the liquid resonant variable focal length lens, it has been desired to use, as an illumination device, the pulsed light illumination instead of the continuous illumination device.

SUMMARY OF INVENTION

An object of the invention is to provide a height measurement method and a height measurement device, which are capable of measuring a height of a workpiece using a liquid resonant variable focal length lens and a continuous illumination.

According to an aspect of the invention, a height measurement method by using an image detection device, in which the image detection device includes: a lens system of a liquid resonant type whose focus position is varied in response to a drive signal to be inputted; a lens controller configured to output the drive signal to the lens system; a continuous illuminator configured to continuously illuminate a workpiece; and an image detector configured to detect an image of the workpiece through the lens system, includes: calculating an EDOF image on a basis of a detected image that is detected by the image detector; causing an extended focal depth of the EDOF image to be increased or decreased by increasing or decreasing an amplitude of the drive signal; determining a focus state of a portion of interest of the workpiece included in the EDOF image; and measuring, as a height of the portion of interest, an upper limit or a lower limit of the extended focal depth, the upper limit or the lower limit being based on a timing at which the focus state of the portion of interest has changed in association with the increase or the decrease of the extended focal depth.

According to another aspect of the invention, a height measurement device includes: a lens system of a liquid resonant type whose focus position is varied in response to a drive signal to be inputted; a lens controller configured to output the drive signal to the lens system; a continuous illuminator configured to continuously illuminate a workpiece; an image detector configured to detect an image of the workpiece through the lens system; an image calculation unit configured to calculate an EDOF image on a basis of a detected image that is detected by the image detector; a focal depth adjustment unit configured to cause an extended focal depth of the EDOF image to be increased or decreased by increasing or decreasing an amplitude of the drive signal; a focus determination unit configured to determine a focus state of a portion of interest of the workpiece included in the EDOF image; and a height measurement unit configured to measure, as a height of the portion of interest, an upper limit or a lower limit of the extended focal depth, the upper limit or the lower limit being based on a timing at which the focus state of the portion of interest has changed in association with the increase or the decrease of the extended focal depth.

BRIEF DESCRIPTION OF DRAWING(S)

Figure 3A:
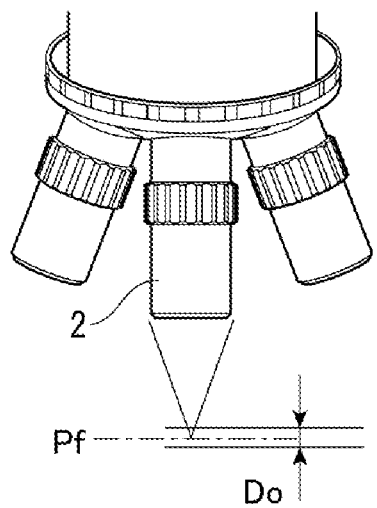

FIG. 3A schematically shows an extended focal depth in the exemplary embodiment.

Figure 3B:
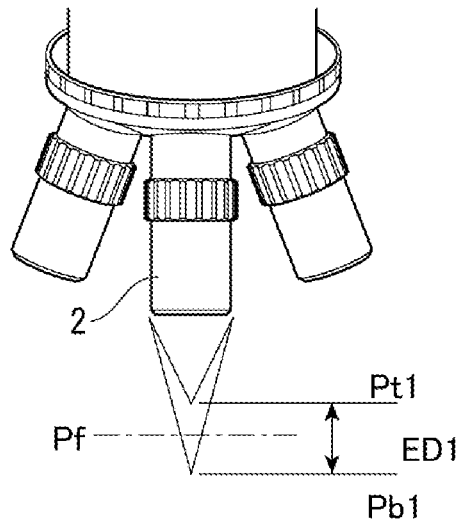

FIG. 3B schematically shows another extended focal depth in the exemplary embodiment.

Figure 3C:
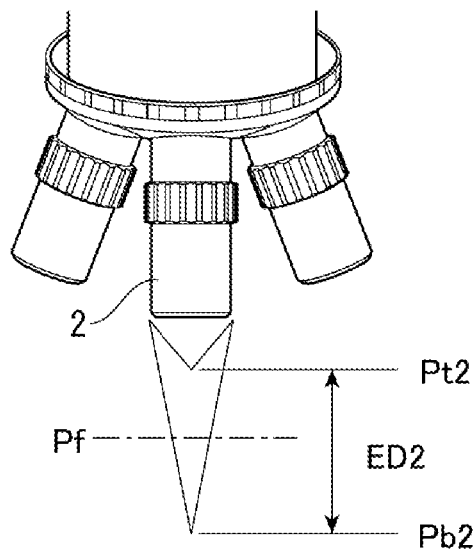

FIG. 3C schematically shows still another extended focal depth in the exemplary embodiment.

Figure 4:
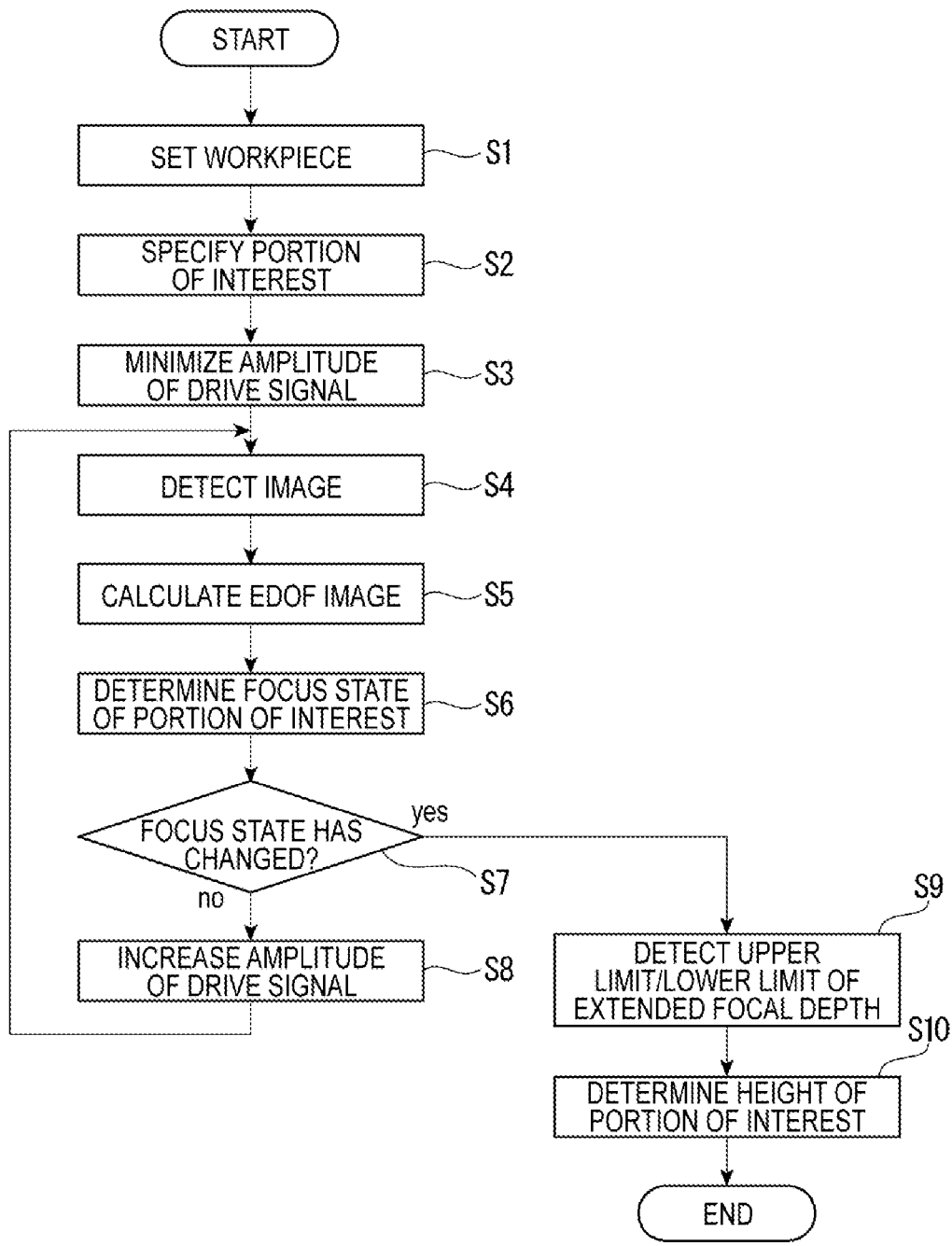

FIG. 4 is a flowchart showing a measurement procedure in the exemplary embodiment.

Figure 5A:
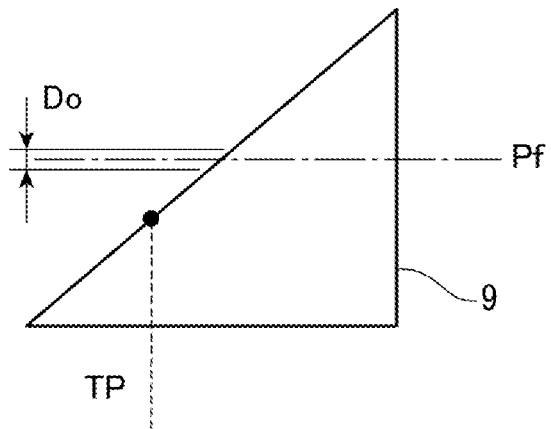

FIG. 5A schematically shows a measurement operation in the exemplary embodiment.

Figure 5B:
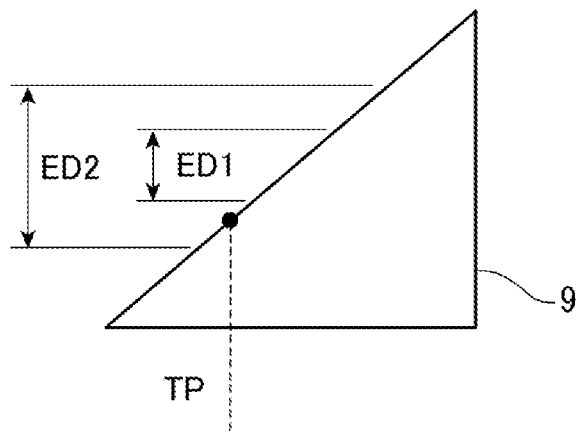

FIG. 5B schematically shows another measurement operation in the exemplary embodiment.

Figure 5C:
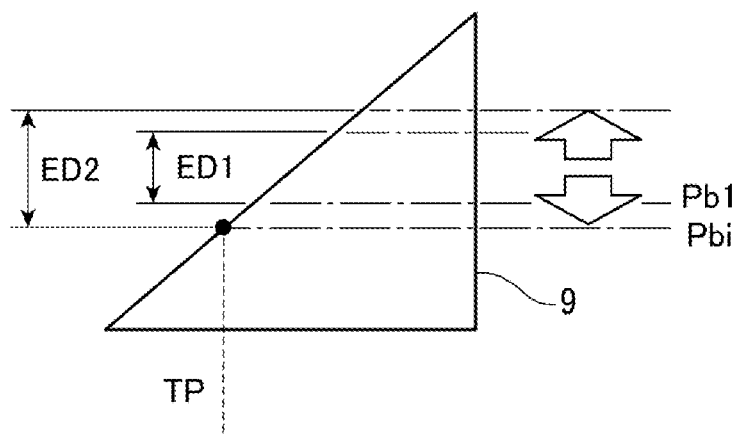

FIG. 5C schematically shows still another measurement operation in the exemplary embodiment.

Figure 6A:
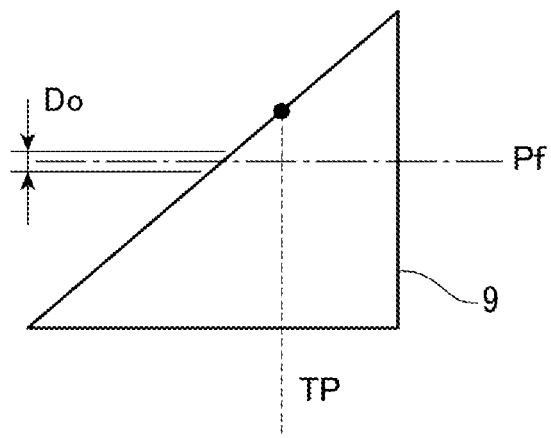

FIG. 6A schematically shows still another measurement operation in the exemplary embodiment.

Figure 6B:
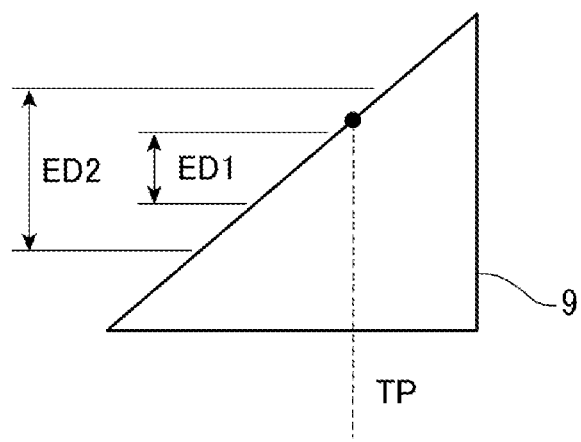

FIG. 6B schematically shows still another measurement operation in the exemplary embodiment.

Figure 6C:
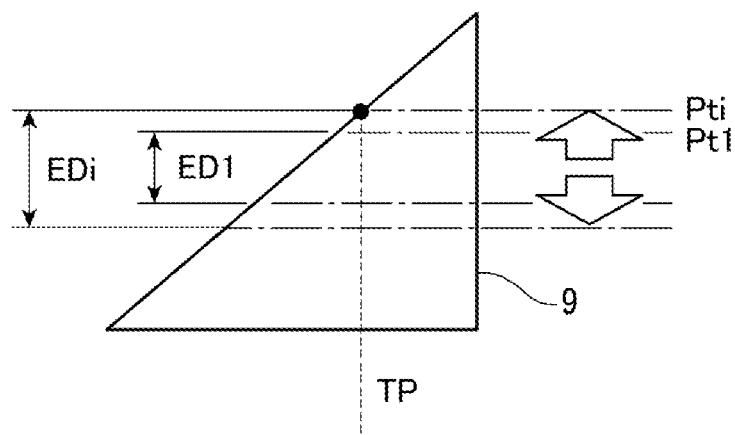

FIG. 6C schematically shows still another measurement operation in the exemplary embodiment.

Figure 7:
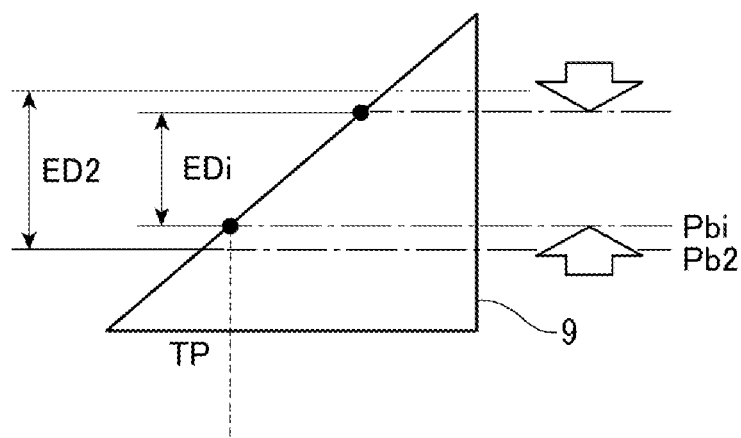

FIG. 7 schematically shows still another measurement operation in the exemplary embodiment.

DESCRIPTION OF EMBODIMENT(S)

An exemplary embodiment of the invention will be described below with reference to the attached drawings.

Figure 1:
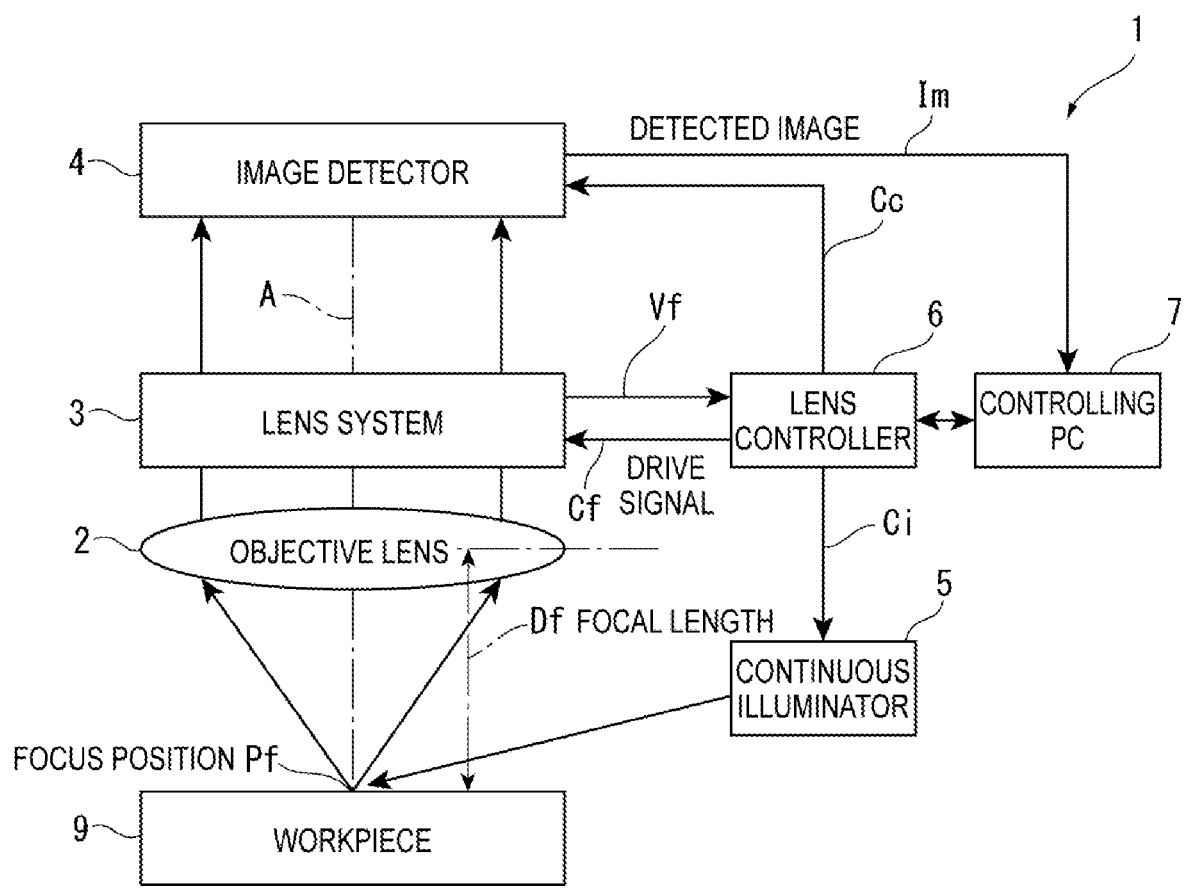
FIG. 1 is a block diagram showing a device configuration of an exemplary embodiment of the invention.

FIG. 1 shows an image detection device 1 which is a basic configuration of a height measurement device according to an exemplary embodiment of the invention.

The image detection device 1 is configured to detect an image of a surface of a workpiece 9 placed in an imaging area while periodically varying a focal length. The image detection device 1 includes an objective lens 2, a lens system 3 and an image detector 4 which are disposed on a common optical axis A intersecting with the surface of the workpiece 9.

The image detection device 1 further includes: a continuous illuminator 5 configured to continuously illuminate the surface of the workpiece 9; a lens controller 6 configured to control an operation of the lens system 3 and an operation of the continuous illuminator 5; and a controlling PC 7 configured to operate the lens controller 6.

An existing convex lens is used as the objective lens 2.

The lens system 3 includes a liquid resonant variable focal length lens, and is configured to change a refractive index thereof in response to a drive signal Cf inputted from the lens controller 6. The drive signal Cf is a sinusoidal alternating-current (AC) signal of a frequency capable of generating a standing wave in the lens system 3.

A focal length Df to a focus position Pf of the image detection device 1 can be changed as desired based on a focal length of the objective lens 2 by changing the refractive index of the lens system 3. In the image detection device 1, the drive signal Cf is a sinusoidal AC signal, and the focus position Pf and the focal length Df also sinusoidally vary periodically.

The image detector 4 includes an existing charge coupled device (CCD) image sensor, any other type of a camera or the like. The image detector 4 is configured to receive an image of the workpiece 9 from the lens system 3 and output the image to the controlling PC 7 in a form of a detected image Im of a predetermined format.

The continuous illuminator 5 includes a light-emitting element such as a light emitting diode (LED). The continuous illuminator 5 is configured to continuously illuminate the surface of the workpiece 9 under control of the lens controller 6.

The driving of the lens system 3, the illumination of the continuous illuminator 5 and the image-detection of the image detector 4 of the image detection device 1 are respectively controlled according to the drive signal Cf, an illumination signal Ci and an image-detection signal Cc outputted from the lens controller 6. The controlling PC 7 is connected to the lens controller 6 in order to, for instance, configure settings of the lens controller 6 that controls the driving of the lens system 3, the illumination of the continuous illuminator 5 and the image-detection of the image detector 4.

Figure 2:
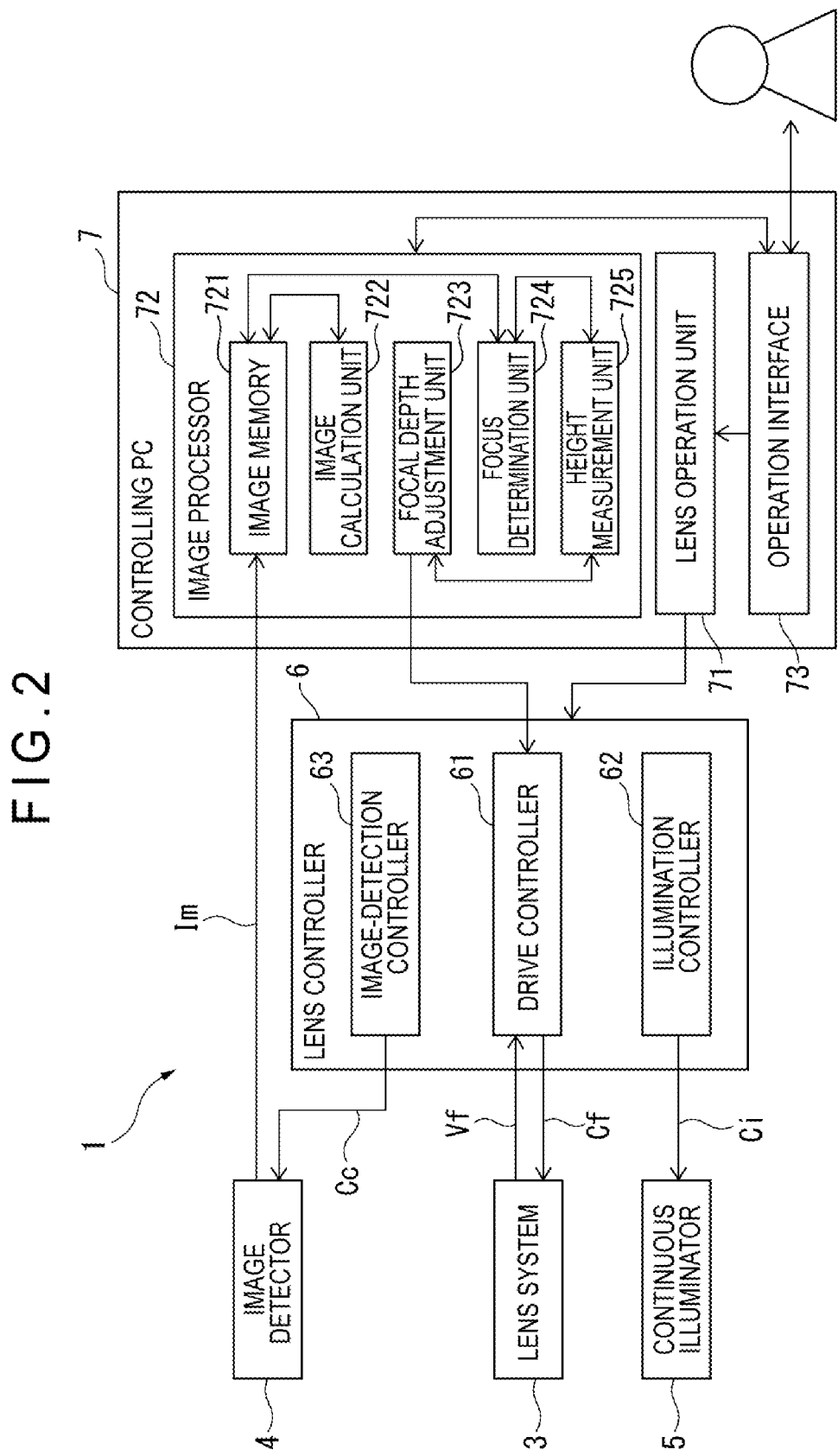
FIG. 2 is a block diagram showing a main part in the exemplary embodiment.

FIG. 2 shows a configuration of the lens controller 6 and the controlling PC 7 according to the exemplary embodiment.

The lens controller 6 is a dedicated unit including hardware that controls the operation of the lens system 3 and the operation of the continuous illuminator 5. The lens controller 6 includes: a drive controller 61 configured to output the drive signal Cf to the lens system 3; an illumination controller 62 configured to output the illumination signal Ci to the continuous illuminator 5; and an image-detection controller 63 configured to output the image-detection signal Cc to the image detector 4.

The drive controller 61 outputs the drive signal Cf to the lens system 3 and detects, when the lens system 3 oscillates in response to the drive signal Cf, an oscillation state Vf of the lens system 3 from an effective power or a drive current applied to the lens system 3. Thereafter, the drive controller 61 adjusts a frequency of the drive signal Cf by referring to the oscillation state Vf of the lens system 3, thereby being able to lock the frequency of the lens system 3 to a current resonant frequency of the lens system 3.

The illumination controller 62 outputs the illumination signal Ci to the continuous illuminator 5 and controls on/off of the continuous illumination performed on the workpiece 9 in the imaging area.

The image-detection controller 63 outputs the image-detection signal Cc to the image detector 4 and controls on/off of the image-detection. It should be noted that the detected image Im corresponding to one frame detected by the image detector 4 during a period from turning on of the image-detection to turning off of the image-detection is sent to and processed in the controlling PC 7.

In the exemplary embodiment, the image-detection signal Cc is continued for a predetermined period of time, during which the workpiece 9 is continuously illuminated and the focus position Pf is periodically varied in response to the drive signal Cf.

The detected image Im detected by the image detector 4 thus forms a focal sweep image over an entire variation range of the focus position Pf, i.e., over an entire focus range of the objective lens 2 and the lens system 3.

The controlling PC 7 includes: a lens operation unit 71 configured to perform various setting operations on the lens controller 6; an image processor 72 configured to capture the detected image Im from the image detector 4 and process the detected image Im; and an operation interface 73 configured to receive a user's operation performed on the image detection device 1.

A general-purpose personal computer is used as the controlling PC 7. A desired function of the controlling PC 7 is achieved by running dedicated software on the controlling PC 7. In other words, a function of the lens operation unit 71 that controls the lens controller 6 is achieved by running lens operation software. In addition, a function of the image processor 72 that processes the detected image Im obtained from the image detector 4 is achieved by running image processing software. The lens operation software and the image processing software can be operated by the user via the operation interface 73 including a display screen and an input device of the controlling PC 7.

In the exemplary embodiment, the image processor 72 executes a height measurement procedure of the invention, whereby the image detection device 1 serves as a height measurement device of the invention.

To that end, the image processor 72 includes an image memory 721, an image calculation unit 722, a focal depth adjustment unit 723, a focus determination unit 724 and a height measurement unit 725.

The image memory 721 is allocated to a memory area of the controlling PC 7, and is able to store image data including the detected image Im from the image detector 4 or various pieces of image data generated by the image processor 72.

The image calculation unit 722, the focal depth adjustment unit 723, the focus determination unit 724 and the height measurement unit 725 are achieved by software to be executed in the controlling PC 7, and are able to execute the height measurement procedure according to the invention.

The image calculation unit 722 calculates the EDOF image on a basis of the detected image Im that is detected by image detector 4 and stored in the image memory 721.

The detected image Im is detected by the image detector 4 in a state in which the workpiece 9 is continuously illuminated by the continuous illuminator 5 and the focus position Pf is periodically varied in response to the drive signal Cf. Accordingly, a focal sweep image is obtained in which a large number of images, corresponding to the respective focus positions Pf to be swept, are superimposed on each other.

The image calculation unit 722 calculates the EDOF image by performing deconvolution using PSF on the focal sweep image obtained by the image detector 4. The extended focal depth (the extended field depth) of the EDOF image is extended to several times to several tens of times the focal depth of the original detected image Im.

The focal depth adjustment unit 723 increases or decreases the amplitude of the drive signal Cf to be sent from the lens controller 6 to the lens system 3, thereby increasing or decreasing the extended focal depth of the EDOF image to be calculated by the image calculation unit 722.

In FIG. 3A, in a case where there is no drive signal Cf or the amplitude of the drive signal Cf is equal to 0 (zero), there is no variation in the focus position Pf, and a focal depth Do is very narrow.

In FIG. 3B, applying the drive signal Cf to the lens system 3 at a small amplitude varies the focus position Pf. At this time, it is assumed that a variation width of the focus position Pf is from an upper limit Pt1 to a lower limit Pb1. The variation in the focus position Pf causes the detected image Im to be made into the focal sweep image, and the calculation of the EDOF image allows an extended focal depth ED1 to be obtained. The extended focal depth ED1 may be, although it depends on a calculation setting, in a range from the upper limit Pt1 to the lower limit Pb1 of the variation width of the focus position Pf, at a maximum.

In FIG. 3C, applying the drive signal Cf to the lens system 3 at an amplitude larger than the amplitude of FIG. 3B causes the variation width of the focus position Pf to be from an upper limit Pt2 to a lower limit Pb2, and an extended focal depth ED2 in a range from the upper limit Pt2 to the lower limit Pb2 is obtained.

In this manner, the extended focal depths (ED1 and ED2) can be increased or decreased by increasing or decreasing the amplitude of the drive signal Cf to be sent from the lens controller 6 to the lens system 3. The extended focal depths ED1 and ED2 can cause a clear increase or decrease (a difference between the upper limit Pt1 and upper limit Pt2 and a difference between the lower limit Pb1 and the lower limit Pb2) according to the extension magnification.

The focus determination unit 724 determines the focus state of the portion of interest of the workpiece 9 included in the EDOF image calculated by the image calculation unit 722. The portion of interest has been specified in advance on the surface of the workpiece 9 by the user.

For the determination of the focus state, an existing determination method that refers to a contrast or the like can be used.

The portion of interest of the workpiece 9 is in the in-focus state when the portion of interest is inside the extended focal depth (ED1 or ED2), and is in an out-of-focus state when the portion of interest is outside the extended focal depth (ED1 or ED2).

Therefore, if the portion of interest of the workpiece 9 is within the variation range of the extended focal depth (between the upper limit Pt1 and the upper limit Pt2 or between the lower limit Pb1 and the lower limit Pb2), the focus state of the portion of interest changes in association with the increase or the decrease of the extended focal depth.

The height measurement unit 725 measures, as a height of the portion of interest, the upper limit or the lower limit of the extended focal depth. The upper limit or the lower limit of the extended focal depth is based on a timing at which the focus state of the portion of interest has changed in association with the increase or the decrease of the extended focal depth.

That is, the height measurement unit 725 controls the focal depth adjustment unit 723 to increase or decrease the amplitude of the drive signal Cf, thereby causing, in the EDOF image calculated by the image calculation unit 722, a clear increase or decrease in the extended focal depth (a difference between the upper limit Pt1 and the upper limit Pt2 and a difference between the lower limit Pb1 and the lower limit Pb2) according to an extension magnification.

During such an increase or decrease of the extended focal depth, the height measurement unit 725 refers to the focus determination performed by the focus determination unit 724. The height measurement unit 725 also sets, as the height of the portion of interest, the upper limit or the lower limit of the extended focal depth. The upper limit or the lower limit of the extended focal depth is based on the timing at which the portion of interest has changed (a timing at which the focus state has changed from the out-of-focus state to the in-focus state, or a timing at which the focus state has changed from the in-focus state to the out-of-focus state). Further, the height measurement unit 725 displays the height to the user via the operation interface 73.

In this exemplary embodiment, the height measurement is performed in the following procedure.

In FIG. 4, upon the measurement, the workpiece 9 is set on the image detection device 1 which is to be used as the height measurement device (Step S1), and a portion of interest on the surface of the workpiece 9 is specified on the detected image Im that is detected by the image detection device 1 (Step S2).

In FIG. 5A, the height from the focus position Pf can be measured if a portion of interest TP of the workpiece 9 is inside the focal depth Do which is an extremely small range. However, if the portion of interest TP of the workpiece 9 is outside the focal depth Do, it is difficult to measure the height of the portion of interest TP without any change.

In FIG. 5B, it is possible to measure the height of the portion of interest TP of the workpiece 9 if the portion of interest TP of the workpiece 9 is in the variation range between the extended focal depth ED1 and the extended focal depth ED2. The extended focal depth ED1 is based on a timing at which the drive signal Cf is reduced. The extended focal depth ED2 is based on a timing at which the drive signal Cf is increased.

In the height measurement according to the exemplary embodiment, first, the drive signal Cf is minimized (Step S3 in FIG. 4). Thereafter, the image detector 4 detects an image (Step S4), the image calculation unit 722 calculates the EDOF image (Step S5), and the focus determination unit 724 determines the focus state of the portion of interest of the calculated EDOF image (Step S6).

Here, the height measurement unit 725 determines a change in the focus state of the portion of interest (Step S7). If the focus state has not changed from the last time, the height measurement unit 725 increases the amplitude of the drive signal Cf (Step S8), and Steps from S4 to S6 are repeated.

In FIG. 5C, in a state where the drive signal Cf is reduced to decrease the extended focal depth ED1, the portion of interest TP is outside the extended focal depth ED1, and is thereby determined to be in the out-of-focus state by the focus determination unit 724.

As the drive signal Cf is increased to gradually increase an extended focal depth EDi from the extended focal depth ED1, the portion of interest TP comes inside the extended focal depth EDi as the upper limit or the lower limit of the current extended focal depth EDi passes the portion of interest TP. The portion of interest TP is thereby determined to be in the in-focus state by the focus determination unit 724.

As a result, the portion of interest TP changes from the previous out-of-focus state to the in-focus state.

When the height measurement unit 725 detects the change in the focus state of the portion of interest TP, the height measurement unit 725 measures the height of the portion of interest TP on the basis of the upper limit or the lower limit of the extended focal depth EDi.

First, the height measurement unit 725 refers to the setting of the calculation of the EDOF image performed by the image calculation unit 722 to detect the upper limit and the lower limit of the extended focal depth EDi (Step S9 in FIG. 4). The height measurement unit 725 thereafter selects either the upper limit or the lower limit of the extended focal depth EDi and sets the selected one of the upper limit and the lower limit as the height of the portion of interest TP (Step S10).

In FIG. 5C, if the portion of interest TP is on a lower limit Pb1 side of the extended focal depth ED1, a lower limit Pbi of the extended focal depth EDi can be measured as the height of the portion of interest TP.

FIGS. 6A to 6C each show a case where the portion of interest TP is on an upper limit Pt1 side of the extended focal depth ED1. Also in this case, an upper limit Pti of the extended focal depth EDi can be measured as the height of the portion of interest TP through the above-described Steps S1 to S10.

It should be noted that whether the height of the portion of interest TP is at the upper limit Pti or the lower limit Pbi of the extended focal depth EDi can be decided in advance on a basis of an approximate positional relationship between the portion of interest TP of the workpiece 9 and the extended focal depth. For example, by identifying whether the portion of interest TP is present above or below an unextended focal depth Do of a detected image Im which is the image prior to being made into the EDOF image, it is possible to decide whether the portion of interest TP is on an upper limit Pti side or a lower limit Pbi side of the extended focal depth EDi. Alternatively, the height of the portion of interest can be determined by performing the height measurement operation described above (Steps S3 to S10 in FIG. 4) two or more times by altering a positional relationship between the workpiece 9 and the objective lens 2.

As described in the exemplary embodiment, it is possible to measure the height of the portion of interest TP of the workpiece 9 by using the lens system 3 which is a liquid resonant variable focal length lens and the continuous illumination performed by the continuous illuminator 5.

As described above, the image of the workpiece 9 is detected by the image detector 4 through the lens system 3 in the invention. Since the continuous illuminator 5 continuously illuminates the workpiece 9, the image Im detected by the image detector 4 is a focal sweep image over an entire focus range of the lens system 3. In this case, the focus range of the lens system 3 is determined by the amplitude of the drive signal Cf (drive current value) from the lens controller 6.

The focal sweep image detected by the image detector 4 is made into the EDOF image by performing a calculation process such as deconvolution using PSF. The extended focal depth EDi (extended field depth) of the EDOF image is extended to several times to several tens of times a focal depth Do of an original detected image Im. Accordingly, if the amplitude of the drive signal Cf of the lens system 3 is increased or decreased to increase or decrease the focal depth Do of the original detected image Im, the extended focal depth EDi shows a clear increase or decrease according to an extension magnification.

If the portion of interest TP of the workpiece 9 is present within such a variation range of the extended focal depth EDi, the height of the portion of interest TP can be measured on a basis of the in-focus state of the portion of interest TP.

For example, if the portion of interest TP is present outside the extended focal depth EDi in a state in which the drive signal Cf is reduced to decrease the extended focal depth EDi, the portion of interest TP is not in an in-focus state. With a gradual increase in the extended focal depth EDi by increasing the drive signal Cf, the portion of interest TP comes inside the extended focal depth EDi and turns into the in-focus state. Such a change in the focus state of the portion of interest TP occurs when the upper limit Pti or the lower limit Pbi of the extended focal depth EDi has exceeded the portion of interest TP. Thus, the height of the portion of interest TP can be measured on a basis of the upper limit Pti or the lower limit Pbi of the extended focal depth EDi. The upper limit Pti or the lower limit Pbi is based on the timing at which the focus state has changed.

It should be understood that the scope of the invention is not limited to the above-described exemplary embodiment(s) but includes modifications and improvements compatible with the invention.

In the exemplary embodiment of FIGS. 1 and 6A to 6C described above, the height of the portion of interest TP is measured by determining that the portion of interest TP has changed from the out-of-focus state to the in-focus state upon gradually increasing the extended focal depth EDi from the state in which the extended focal depth ED1 is decreased.

In contrast, as shown in FIG. 7, the height of the portion of interest TP may also be measured by determining that the portion of interest TP has changed from the in-focus state to the out-of-focus state upon gradually decreasing the extended focal depth EDi from a state in which the extended focal depth ED2 is increased.

In other words, the height may be measured in a similar manner upon decreasing the extended focal depth EDi from the increased state thereof, by determining that the in-focus state turns into the state that is not in focus.

It should be noted that whether the height of the portion of interest TP is at the upper limit Pti or the lower limit Pbi of the extended focal depth EDi can be decided in advance on a basis of an approximate positional relationship between the portion of interest TP of the workpiece 9 and the extended focal depth EDi. For example, by identifying whether the portion of interest TP is present above or below an unextended focal depth Do of the detected image which is the image prior to being made into the EDOF image, it is possible to decide whether the portion of interest TP is on an upper limit Pti side or a lower limit Pbi side of the extended focal depth EDi. Alternatively, the height of the portion of interest TP can be determined by performing the height measurement operation described above two or more times by altering a positional relationship between the workpiece 9 and the lens system 3.

As described above, a height measurement method and a height measurement device, which are capable of measuring a height of a workpiece 9 using a liquid resonant variable focal length lens 3 and a continuous illumination, can be provided in the invention.

What is claimed is:

1. A height measurement method by using an image detection device, the image detection device comprising:

a lens system of a liquid resonant type whose focus position is varied in response to a drive signal to be inputted;

a lens controller configured to output the drive signal to the lens system;

a continuous illuminator configured to continuously illuminate a workpiece; and an image detector configured to detect an image of the workpiece through the lens system, the height measurement method comprising:

calculating an EDOF image on a basis of a detected image that is detected by the image detector;

causing an extended focal depth of the EDOF image to be increased or decreased by increasing or decreasing an amplitude of the drive signal;

determining a focus state of a portion of interest of the workpiece included in the EDOF image; and measuring, as a height of the portion of interest, an upper limit or a lower limit of the extended focal depth, the upper limit or the lower limit being based on a timing at which the focus state of the portion of interest has changed in association with the increase or the decrease of the extended focal depth.

2. A height measurement device comprising:

a lens system of a liquid resonant type whose focus position is varied in response to a drive signal to be inputted;

a lens controller configured to output the drive signal to the lens system;

a continuous illuminator configured to continuously illuminate a workpiece;

an image detector configured to detect an image of the workpiece through the lens system;

an image calculation unit configured to calculate an EDOF image on a basis of a detected image that is detected by the image detector;

a focal depth adjustment unit configured to cause an extended focal depth of the EDOF image to be increased or decreased by increasing or decreasing an amplitude of the drive signal;

a focus determination unit configured to determine a focus state of a portion of interest of the workpiece included in the EDOF image; and a height measurement unit configured to measure, as a height of the portion of interest, an upper limit or a lower limit of the extended focal depth, the upper limit or the lower limit being based on a timing at which the focus state of the portion of interest has changed in association with the increase or the decrease of the extended focal depth.

* * * * *